US009092192B2

(12) United States Patent
Kudrna et al.

(10) Patent No.: US 9,092,192 B2
(45) Date of Patent: Jul. 28, 2015

(54) ELECTRONIC MOBILE DEVICE SEAMLESS KEY/DISPLAY STRUCTURE

(75) Inventors: Paul John Kudrna, Rolling Meadows, IL (US); Michael Thomas Pope, Rolling Meadows, IL (US); James Nelson Aldrich, Rolling Meadows, IL (US); Chin Feng Hsu, Rolling Meadows, IL (US); Yun Sun Lee, Rolling Meadows, IL (US); David Anthony Dettling, Rolling Meadows, IL (US)

(73) Assignee: Blackberry Limited, Waterloo, Ontario (CA)

( * ) Notice: Subject to any disclaimer, the term of this patent is extended or adjusted under 35 U.S.C. 154(b) by 1010 days.

(21) Appl. No.: 13/021,022

(22) Filed: Feb. 4, 2011

(65) Prior Publication Data
US 2012/0200502 A1    Aug. 9, 2012

(51) Int. Cl.
*G06F 3/02* (2006.01)
*G06F 1/16* (2006.01)
*G06F 3/0354* (2013.01)

(52) U.S. Cl.
CPC ............. *G06F 1/1626* (2013.01); *G06F 1/169* (2013.01); *G06F 3/03547* (2013.01); *G06F 2203/04105* (2013.01)

(58) Field of Classification Search
CPC ........ G06F 3/02; G06F 3/0219; G06F 3/0213
USPC .............. 345/156–158, 168–173; 341/21–23; 200/5 A, 6 A, 5 R, 6 R, 339, 343, 200/510–514
See application file for complete search history.

(56) References Cited

U.S. PATENT DOCUMENTS

| 5,504,286 | A | 4/1996 | Tsai |
|---|---|---|---|
| 6,157,323 | A | 12/2000 | Tso et al. |
| 7,131,780 | B2 | 11/2006 | Hirsch |
| 7,217,898 | B2 | 5/2007 | Chien et al. |
| 7,345,250 | B2 | 3/2008 | Hakunti et al. |
| 8,263,889 | B2 | 9/2012 | Takahashi et al. |
| 8,362,371 | B2 | 1/2013 | Chen |

(Continued)

FOREIGN PATENT DOCUMENTS

| CN | 101495944 A | 7/2009 |
|---|---|---|
| CN | 101828379 A | 9/2010 |

(Continued)

OTHER PUBLICATIONS

European Patent Office, Extended European Search Report, Application No. 11153444.2, Jul. 11, 2011.

(Continued)

*Primary Examiner* — Kimnhung Nguyen
(74) *Attorney, Agent, or Firm* — Trop, Pruner & Hu, P.C.

(57) ABSTRACT

A key/display assembly includes a first switch and a display module disposed aside the first switch. A touch-سensitive input panel overlies the first switch and the display module, and the touch-sensitive input panel includes a first touch-sensitive region proximate the first switch. The electronic mobile device further includes a first key defined by the first switch and the first touch-sensitive region. As such, the first key is actuated by pressing the first touch-sensitive region to displace the first touch-sensitive region and thereby actuate the first switch.

17 Claims, 5 Drawing Sheets

(56) References Cited

U.S. PATENT DOCUMENTS

| 8,362,372 | B2* | 1/2013 | Kudrna et al. ............ 200/5 A |
|---|---|---|---|
| 2005/0277448 | A1 | 12/2005 | Castaneda et al. |
| 2006/0181517 | A1 | 8/2006 | Zadesky et al. |
| 2008/0060928 | A1 | 3/2008 | Babella |
| 2008/0237013 | A1 | 10/2008 | Shibuya et al. |
| 2009/0009480 | A1 | 1/2009 | Heringslack |
| 2009/0033522 | A1 | 2/2009 | Skillman et al. |
| 2009/0135145 | A1 | 5/2009 | Chen et al. |
| 2010/0078303 | A1 | 4/2010 | Larsen et al. |
| 2010/0253629 | A1 | 10/2010 | Orsley |

FOREIGN PATENT DOCUMENTS

| EP | 1460821 A2 | 9/2004 |
|---|---|---|
| WO | 2008014110 A2 | 1/2008 |

OTHER PUBLICATIONS

BlackBerry—Storm 2 Touch Screen Phone—New Storm2 9550 Smartphone, http://us.blackberry.com/smartphones/blackberrystorm/, accessed Dec. 13, 2010.

BlackBerry—Curve 9300 Phone—New BlackBerry Curve 3G Smartphone, http://na.blackberry.com/eng/devices/blackberrycurve3G/, accessed Oct. 15, 2010.

BlackBerry Curve 9300 Keypad with Lens Removed (Picture), received Nov. 2, 2010.

European Patent Office, Extended Search Report, Application No. 11153449.1, Jun. 30, 2011, 7 pages.

Canadian Intellectual Property Office, Examination Report, Application No. 2,765,693, Dec. 20, 2013, 2 pages.

State Intellectual Property Office of People'S Republic of China, First Office Action, Application No. 201210019883.1, Apr. 2, 2014, 22 pages.

State Intellectual Property Office of People'S Republic of China, Second Office Action, Application No. 201210019883.1, Nov. 15, 2014, 7 pages.

Canadian Intellectual Property Office, Examination Report, Application No. 2,765,689, Jan. 3, 2014, 3 pages.

State Intellectual Property Office of People'S Republic of China, First Office Action, Application No. 201210019582.9, Nov. 27, 2014, 33 pages.

BlackBerry—Storm 2 Touch Screen Phone—New Storm2 9550 Smartphone, http://us.blackberry.com/smartphones/ blackberrystorm/ accessed Dec. 13, 2010, 3 pages.

BlackBerry—Curve 9300 Phone—New BlackBerry Curve 3G Smartphone, http://natlackberry.com/eng/devices/blackberrycurve3G/ accessed Oct. 15, 2010, 3 pages.

BlackBerry Curve 9300 Keypad with Lens Removed (Picture), received Nov. 2, 2010, 1 page.

* cited by examiner

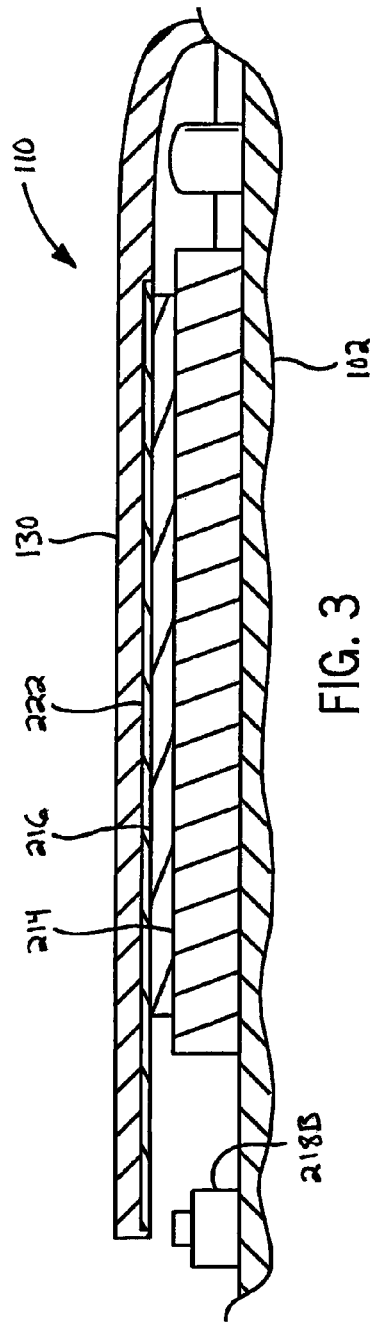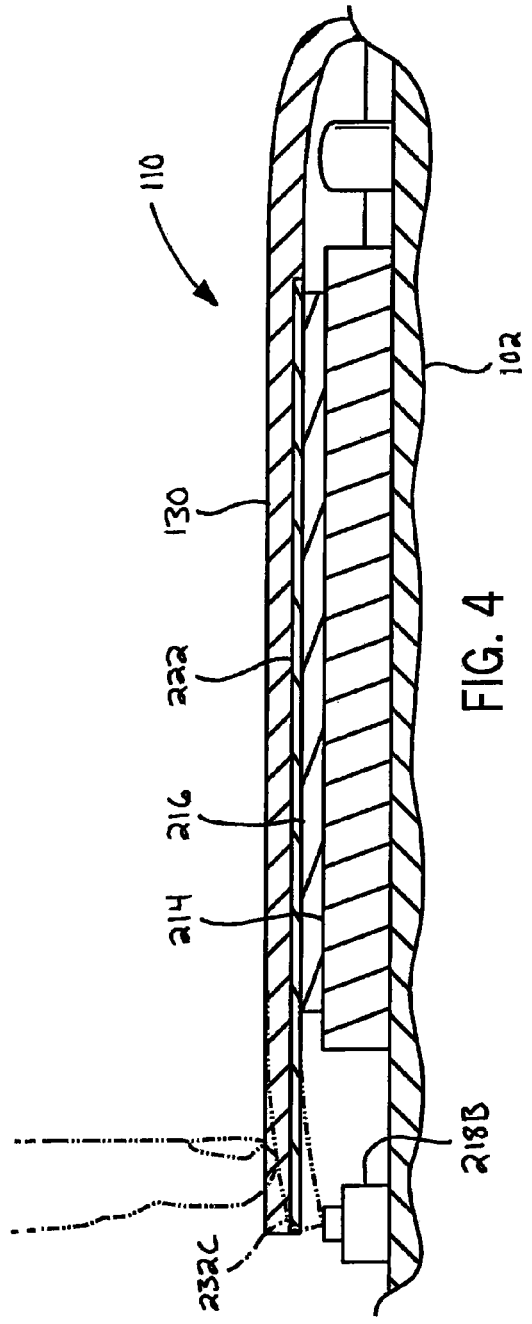

ELECTRONIC MOBILE DEVICE SEAMLESS KEY/DISPLAY STRUCTURE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

The present disclosure generally relates to electronic mobile devices, and more particularly to key and display structures of electronic mobile devices.

In the design of electronic mobile devices, such as cellular phones and the like, there is an inclination to continuously improve aesthetic qualities. One manner for making such improvements involves designing smaller and/or thinner devices by using smaller and/or thinner components. Another manner for making aesthetic improvements includes using visually and/or tactilely pleasing individual components. One set of visually pleasing components includes an external lens that overlies a display module and defines, in part, one or more adjacent menu keys. This structure provides a smooth appearance with few, if any, breaks or discontinuities on the lens between the display module and the keys and between the keys themselves. As such, the keys appear to be part of a bezel structure that surrounds the display.

The above keys, while aesthetically pleasing, can be difficult for a user to manipulate. For example, if each key includes a mechanical switch (i.e., a dome switch) beneath the lens, the keys can be prone to "falsing". That is, keys may be inadvertently deflected and actuated when pressing a neighboring key due to the continuous structure of the lens. Slits or breaks can be provided between adjacent keys to prevent adjacent lens portions from unintentionally deflecting, although such a solution reduces the aesthetic appeal of the device.

Another solution to address key falsing involves using a touch-sensitive input device instead of mechanical switches. A touch-sensitive input can readily distinguish key presses between adjacent keys that are defined, in part, by a common lens structure. However, such touch-sensitive inputs typically do not provide tactile feedback to indicate to a user that a key has been successfully pressed.

BRIEF DESCRIPTION OF THE DRAWINGS

FIG. 3 is a section view of the key/display assembly along line 3-3 of FIG. 1;

FIG. 4 is a section view of the key/display assembly along line 3-3 of FIG. 1 showing deflection of a menu key;

DETAILED DESCRIPTION

According to some embodiments, a key/display assembly comprises a first switch and a display module disposed aside the first switch. A touch-sensitive input panel overlies the first switch and the display module, and the touch-sensitive input panel includes a first touch-sensitive region proximate the first switch. The electronic mobile device further includes a first key having at least one of an invariant text character and an invariant functional character. The first key is further defined by the first switch and the first touch-sensitive region. As such, the first key is actuated by pressing the first touch-sensitive region to displace the first touch-sensitive region and thereby actuate the first switch.

The teachings of the present disclosure relate generally to portable electronic devices, e.g., mobile communication devices such as pagers, cellular phones, global positioning system (GPS) navigation devices and other satellite navigation devices, smart phones, wireless organizers, wireless personal digital assistants (PDA), and tablet computers. The portable electronic devices could be devices without wireless communication capabilities such as PDAs, electronic gaming devices, digital photograph albums or picture frames, digital cameras, or digital video recorders. These examples are intended to be non-limiting. It is also possible that the teachings of the present disclosure could be applied to electronic devices other than handheld electronic devices, e.g., notebook computers.

Figure 1:
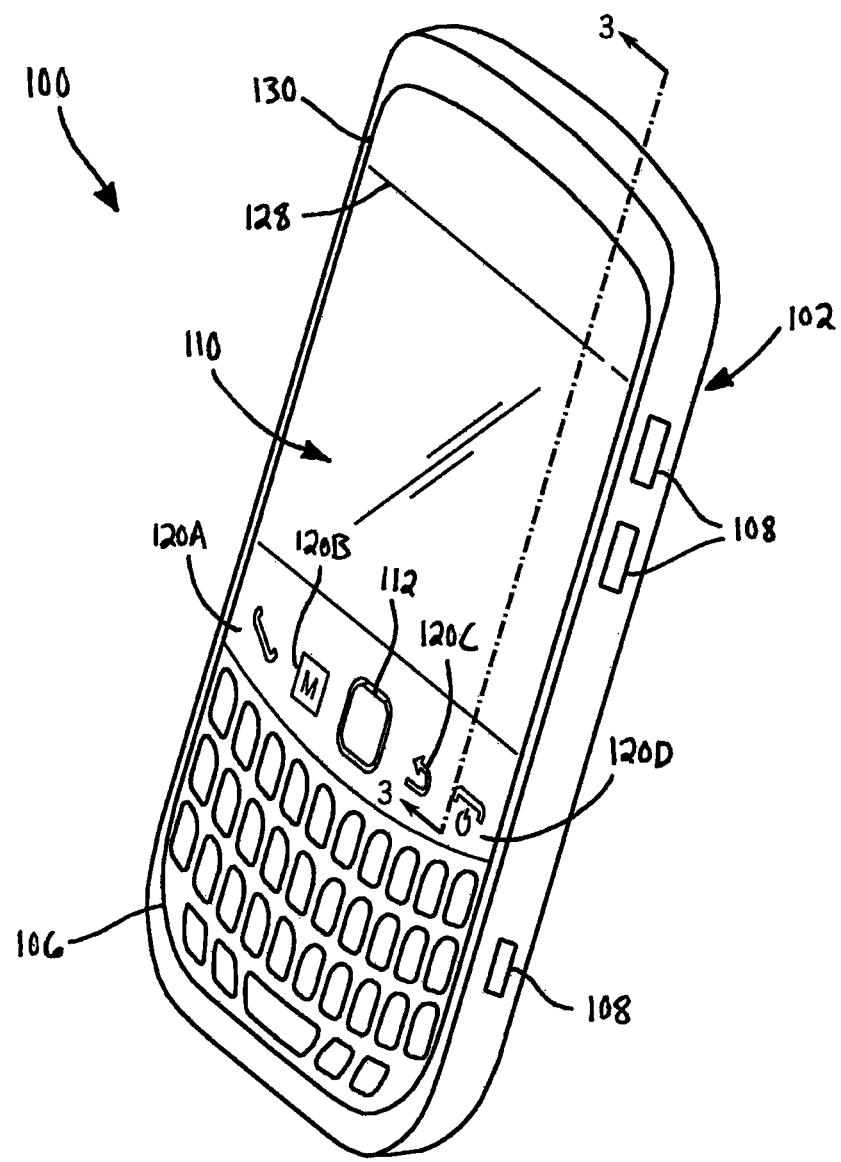
FIG. 1 is a perspective view of an electronic mobile device including a key/display assembly according to the present disclosure.
Figure 2:
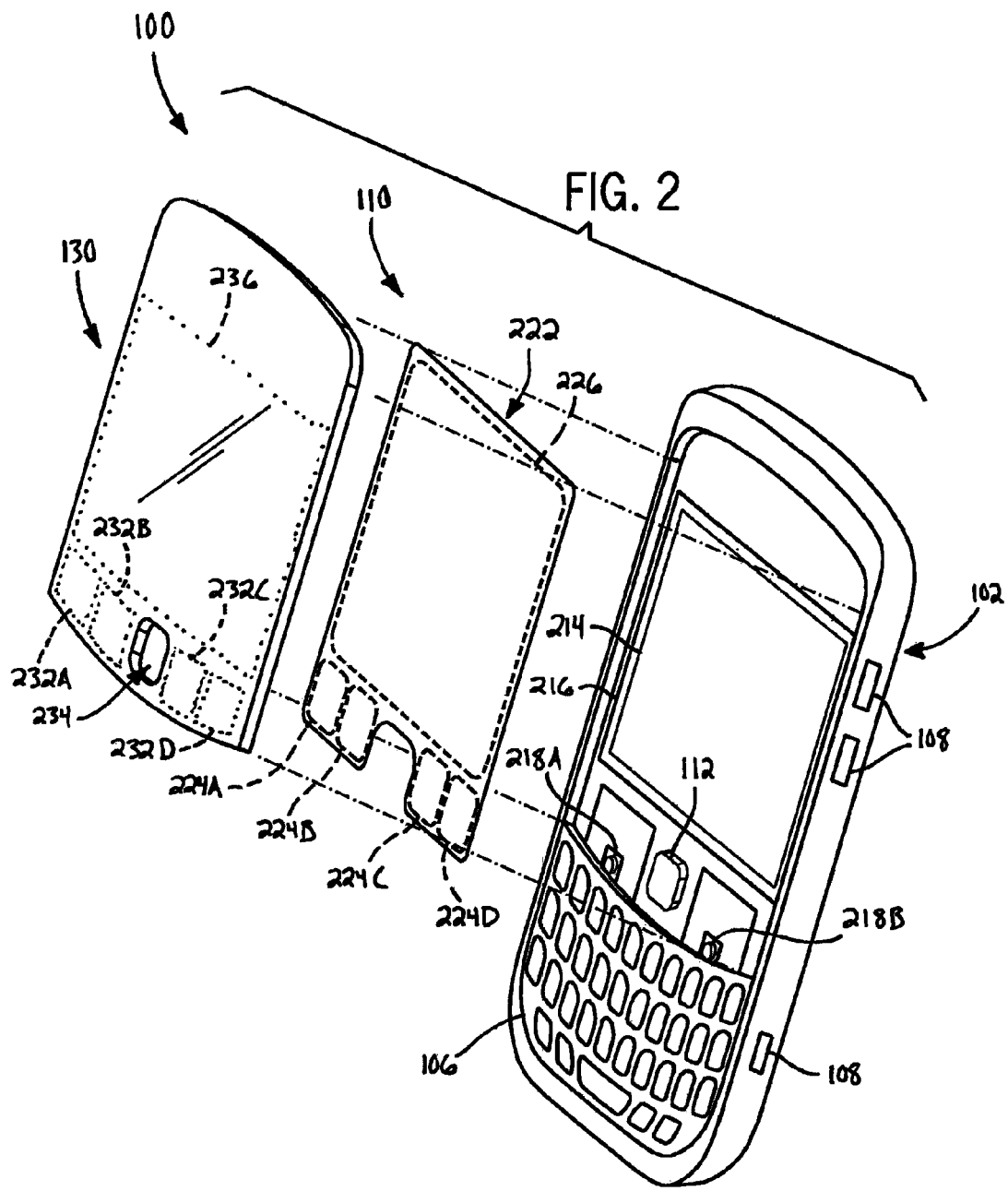
FIG. 2 is a partially exploded perspective view of the key/display assembly of FIG. 1.
Figure 5:
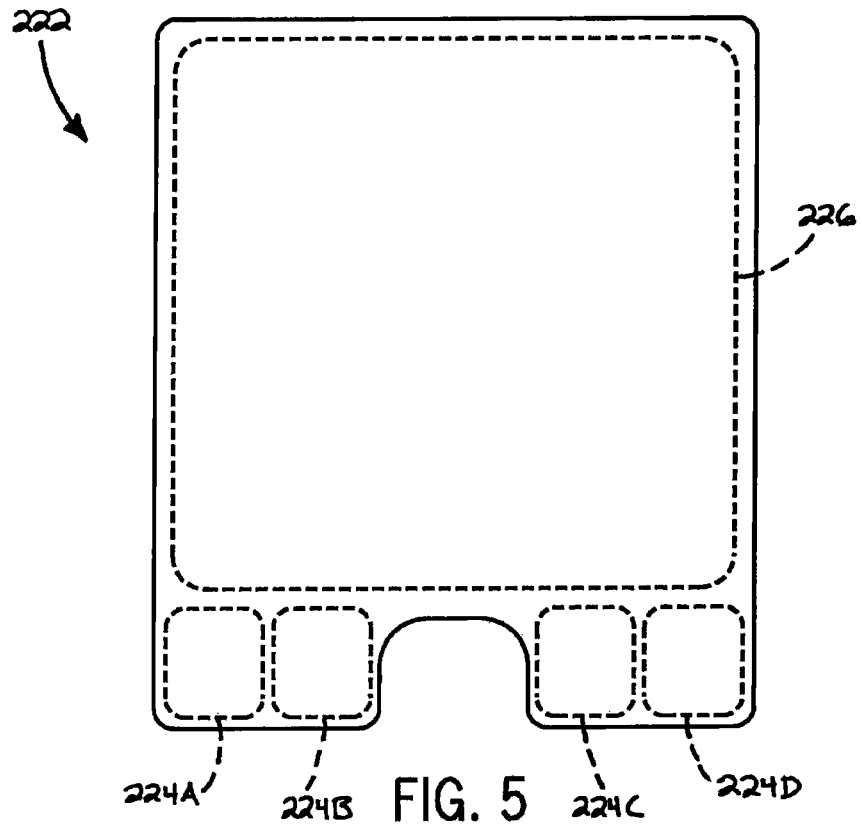
FIG. 5 is a top view of a touch-sensitive input panel of the key/display assembly of FIG. 1.
Figure 6:
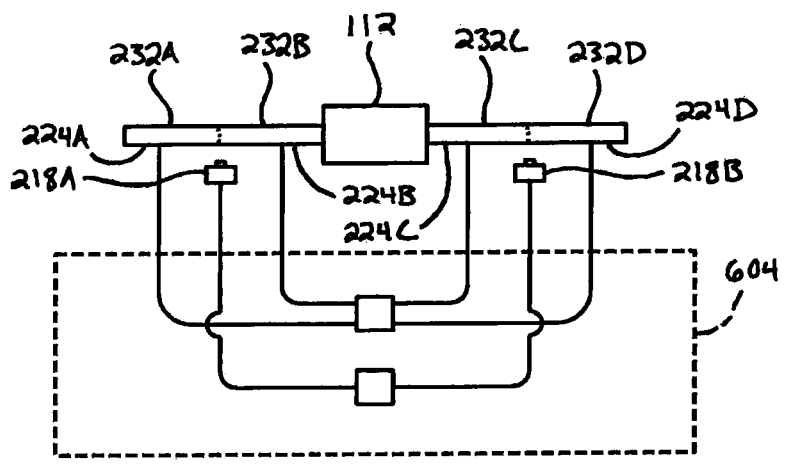
FIG. 6 is a schematic of menu keys of the key/display assembly and associated electrical components.

Referring now to FIGS. 1-6, an electronic mobile device 100 according to the present disclosure generally includes a base 102 that houses various electronic components that control operation of the device, such as a microprocessor 604 (FIG. 6). The base 102 also supports a keypad or keyboard 106 on a front surface thereof. The keypad 106 includes keys that are actuatable by a user to provide inputs to the device 100 (e.g., to enter alphanumeric characters and the like). Sides of the base 102 may also support volume control or shortcut keys 108.

Above the keypad 106, the front surface of the base 102 supports a menu key/display assembly 110. As the name implies, the key/display assembly 110 is actuatable to perform various tasks (e.g., place and end voice calls, enter and exit device applications, and the like) and displays information to the user. Furthermore, with the exception of an optical trackpad 112 or the like, the key/display assembly has a generally continuous and aesthetically pleasing external appearance. The following paragraphs describe more specifically the structure of the key/display assembly that provides this pleasing appearance in addition to improved key manipulability.

Still referring to FIGS. 1-6, the key/display assembly 110 includes a display module 214 (FIG. 2) received in the base 102 and in communication with the processor 604. The display module 214 displays information to the device user and, in some embodiments, is a liquid crystal display (LCD) module. Alternatively, the display module 214 may be another type of display device, such as an organic light emitting diode (OLED) module, a plasma display panel (PDP) module, or the like.

An open-rectangular gasket 216 (FIG. 2) surrounds the display module 214 on a side adjacent to the front surface of the base 102. In some embodiments, the gasket 216 comprises a semi-elastic polymer, such as silicone, although other similar materials may alternatively be used. Regardless of the specific material, the gasket 216 provides impact resistance for the display module 214. In addition, the gasket 216 also permits several components of the key/display assembly 110 to deflect as described in further detail below.

The key/display assembly 110 further includes first and second switches 218A, 218B (FIG. 2) supported by the base 102 and in communication with the processor 604. The switches 218A, 218B are disposed to the side of the display module 214 proximate the keypad 106 and on opposite sides of the trackpad 112. In some embodiments, the switches 218A, 218B are mechanical dome switches that "snap" when actuated by the user. Alternatively, the switches 218A, 218B may be any other type that provides tactile feedback to the user when actuated.

Each of the first and second switches 218A, 218B define, in part, two menu keys of the key/display assembly 110 that are actuatable to perform various tasks. In particular, the first switch 218A defines, in part, a first key 120A (FIG. 1) that is actuatable, e.g., to place a voice call or display "recent calls" information. The first switch 218A also defines, in part, a second key 120B that is actuatable, e.g., to display an application menu. The second switch 218B defines, in part, a third key 120C that serves as, e.g., a "back" or "escape" key. The second switch 218B also defines, in part, a fourth key 120D that is actuatable, e.g., to end a voice call or serve as an on/off button for the electronic mobile device 100.

The first and second switches 218A, 218B are not prone to falsing due in part to their position on opposite sides of the trackpad 112 and because there are fewer switches 218A, 218B than menu keys 120A-D. For the latter reason, however, actuating one of the switches 218A, 218B only indicates to the processor 604 that one of two menu keys has been pressed. In order to determine which specific key has been pressed, the key/display assembly 110 further includes a touch-sensitive input panel 222 (FIG. 2) disposed above the compressible gasket 216 and in communication with the processor 604.

In some embodiments, the touch-sensitive input panel 222 is a capacitive touch-sensitive panel that senses electrically conductive objects such as the user's fingers. Alternatively, the touch-sensitive input panel 222 may be another type of touch-sensitive panel, such as a resistive touch-sensitive panel, an infrared touch-sensitive panel, or the like. In any case, the touch-sensitive input panel 222 has multiple touch-sensitive regions that are actuated by (i.e., sense the inputs of) the device user. In particular, the touch-sensitive input panel 222 includes a first touch-sensitive region 224A (FIG. 2) further defining the first key 120A, a second touch-sensitive region 224B further defining the second key 120B, a third touch-sensitive region 224C further defining the third key 120C, and a fourth touch-sensitive region 224D further defining the fourth key 120D. As such, actuating the first touch-sensitive region 224A and the first switch 218A indicates to the processor 604 that the first key 120A has been pressed, actuating the second touch-sensitive region 224B and the first switch 218A indicates that the second key 120B has been pressed, actuating the third touch-sensitive region 224C and the second switch 218B indicates that the third key 120C has been pressed, and actuating the fourth touch-sensitive region 224D and the second switch 218B indicates that the fourth key 120D has been pressed.

In addition to the touch-sensitive regions 224A-D described above, in some embodiments, the touch-sensitive input panel 222 further includes a display touch-sensitive region 226 (FIG. 2) overlying the display module 214. The display touch-sensitive region 226 is actuatable to serve as an input device for the electronic mobile device 100 in addition to the keypad 106 and the menu keys 120A-D.

The key/display assembly 110 further includes an opaque bezel 128 (FIG. 1; hidden in FIG. 2) overlying the touch-sensitive input panel 222 and extending about the perimeter of the display module 214. Alternatively, the bezel 128 may be disposed beneath the touch-sensitive input panel 222; in either case, the bezel 128 obscures the internal components of the electronic mobile device 100 with the exception of the display module 214. The bezel 128 also includes invariant indicia (i.e., invariant text characters, such as letters, numbers, punctuation, and symbols, and invariant functional characters, such as shift, enter, delete, menu, back, place call, end call, 'sym', and 'aft') aligned with the touch-sensitive regions 224A-D and corresponding to the functions of the menu keys 120A-D. For example, the bezel 128 includes a telephone-shaped functional character aligned with the first touch-sensitive region 224A and corresponding to the "place call" function of the first key 120A.

As used herein, the term "invariant", when used to describe indicia, means that the text and/or functional character of a key does not change to other text and functional characters. However, the function performed by pressing such a key may vary depending on the operating mode of the electronic mobile device (e.g., if placing a phone call, sending a text message, playing a game, etc.). Furthermore, invariant indicia may be transparent or translucent and may be illuminated by internal device components depending on the operating mode of the electronic mobile device (e.g., upon sensing low-light conditions).

The key/display assembly 110 further includes a lens 130 that overlies the display module 214, the gasket 216, the switches 218A, 218B, the touch-sensitive input panel 222, and the bezel 128. The lens 130 protects the components disposed therebelow and inhibits debris from entering the electronic mobile device 100. As such, the lens 130 may comprise materials such as polycarbonates, acrylics, thermoplastic elastomers (TPEs), and the like.

The lens 130 includes contact regions 232A-D (FIG. 2) that are cantilevered past the edge of the display module 214 (i.e., extend past the edge of the display module 214 such that the end of the lens 130 away from the display module 214 is unsupported) and overlie the touch-sensitive regions 224A-D to further define the menu keys 120A-D. In particular, a first contact region 232A overlies the first touch-sensitive region 224A to further define the first menu key 120A, a second contact region 232B overlies the second touch-sensitive region 224B to further define the second menu key 120B, a third contact region 232C overlies the third touch-sensitive region 224C to further define the third menu key 120A, and a fourth contact region 232D overlies the fourth touch-sensitive region 224D to further define the fourth menu key 120D. As such, pressing and deflecting the first contact region 232A thereby actuates the first touch-sensitive region 224A and the first switch 218A to indicate to the processor 604 that the first key 120A has been pressed. Pressing and deflecting the second contact region 232B thereby actuates the second touch-sensitive region 224B and the first switch 218A to indicate that the second key 120B has been pressed. Pressing and deflecting the third contact region 232C thereby actuates the third touch-sensitive region 224C and the second switch 218B to indicate that the third key 120C has been pressed (FIGS. 3-4). Lastly, pressing and deflecting the fourth contact region 232D thereby actuates the fourth touch-sensitive region 224D and the second switch 218B to indicate that the fourth key 120D has been pressed.

In order to provide an aesthetically pleasing appearance, the lens 130 is generally continuous (i.e., lacking breaks and changes in thickness) with the exception of a passageway 234 through which the trackpad 112 extends. In particular, the lens 130 is continuous between the first and second contact regions 232A and 232B and between the third and fourth contact regions 232C and 232D. Furthermore, the lens 130 is also continuous between a display region 236 that overlies the display module 214 and the contact regions 232A-D.

Figure 7:
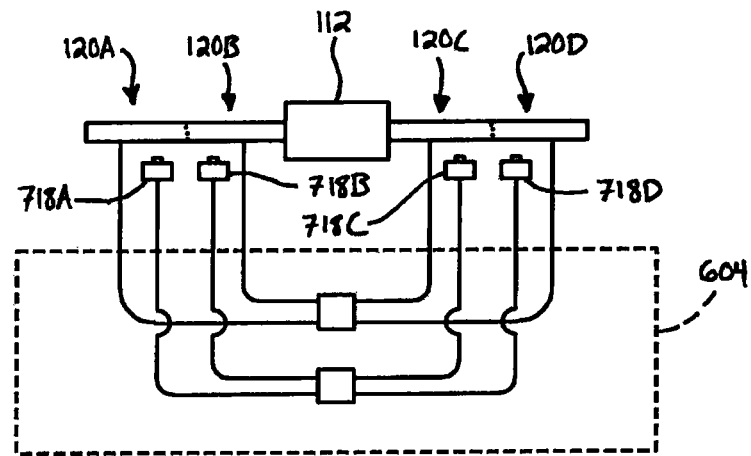
FIG. 7 is a schematic of an alternative embodiment of the menu keys of the key/display assembly and the associated electrical components.

The key/display assembly 110 described above may be modified in various manners without departing from the scope of the disclosure. For example and referring to FIG. 7, in some embodiments each of the menu keys 120A-D is defined by a separate mechanical switch 718A-D. If two adjacent switches (e.g., 718A and 718B) are simultaneously actuated due to falsing, the processor 604 may determine which menu key has been pressed based on actuation of the separate contact regions of the touch-sensitive panel 222.

Figure 8:
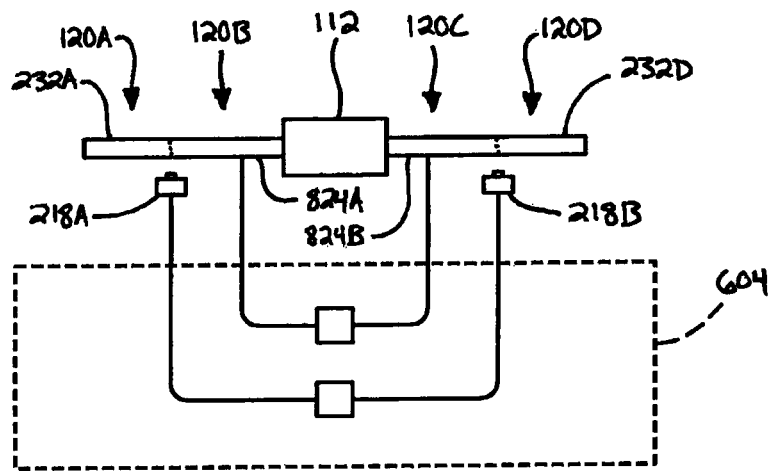
FIG. 8 is a schematic of another alternative embodiment of the menu keys of the key/display assembly and the associated electrical components.

As another example and referring now to FIG. 8, in some embodiments the touch-sensitive input panel 222 only includes first and second touch-sensitive input regions 824A and 824B. The first and second touch-sensitive input regions 824A and 824B are disposed on opposite sides of the trackpad 112 and are spaced apart from the first and fourth contact regions 232A and 232D of the lens 130. As such, the first and second touch-sensitive input regions 824A and 824B do not define the first and fourth menu keys 120A and 120D, respectively. Therefore, in these embodiments, actuating the first switch 218A without actuating the first touch-sensitive region 824A indicates to the processor 604 that the first key 120A has been pressed, actuating the first touch-sensitive region 824A and the first switch 218A indicates that the second key 120B has been pressed, actuating the second touch-sensitive region 824B and the second switch 218B indicates that the third key 120C has been pressed, and actuating the second switch 218B without actuating the second touch-sensitive region 824B indicates that the fourth key 120D has been pressed.

The structure of the key/display assembly 110 can also differ from the above embodiments in other manners. For example, in some embodiments the touch-sensitive input panel 222 and the lens 130 are a single integral component (e.g., if the touch-sensitive panel 222 is an acoustic pulse recognition touch-sensitive panel connected to piezoelectric sensors). In these embodiments, the touch-sensitive input panel 222 is generally continuous to provide an aesthetically pleasing external appearance. As yet another example, in some embodiments the optical trackpad 112 is omitted and the lens 130 is generally continuous between the second contact region 232B and the third contact region 232C.

From the above description it should be apparent that the present disclosure provides an electronic mobile device that has an aesthetically pleasing external appearance due to a generally continuous protective lens. In addition, the key/display assembly has a structure that inhibits switch falsing while providing tactile feedback to the device user. Further still, the use of mechanical switches permits one or more of the menu keys to serve as on/off buttons for the device.

The various embodiments presented above are merely examples and are in no way meant to limit the scope of this disclosure. Variations of the embodiments described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A key/display, assembly, comprising:
   a first switch;
   a display module disposed aside the first switch;
   a touch-sensitive input panel overlying the first switch and the display module, the touch-sensitive input panel including a first touch-sensitive region proximate the first switch;
   a first key having at least one of an invariant text character and an invariant functional character, the first key being further defined by the first switch and the first touch-sensitive region such that the first key is actuated by pressing the first touch-sensitive region to displace the first touch-sensitive region and thereby actuate the first switch.

2. The key/display assembly of claim 1, wherein the first touch-sensitive region is cantilevered past an edge of the display module.

3. The key/display assembly of claim 1, further comprising a compressible gasket disposed between the display module and the touch-sensitive input panel and proximate the edge of the display module.

4. The key/display assembly of claim 1, further comprising a lens overlying the first switch, the display module, and the touch-sensitive input panel, and the lens including a first contact region overlying the first touch-sensitive region; and
   wherein the first key is further defined by the first switch, the first touch-sensitive region, and the first contact region such that the first key is actuated by pressing the first contact region to thereby actuate the first touch-sensitive region and the first switch.

5. The key/display assembly of claim 4, wherein the lens further includes a second contact region defining a second key having at least one of an invariant text character and an invariant functional character.

6. The key/display assembly of claim 5, wherein the lens is continuous between the first contact region and the second contact region.

7. The key/display assembly of claim 5, wherein the touch-sensitive input panel further includes a second touch-sensitive region, and the second key is further defined by the second touch-sensitive region such that the second key is actuated by pressing the second contact region to thereby actuate the second touch-sensitive region.

8. The key/display assembly of claim 7, further comprising a second switch, and wherein the second key is further defined by the second switch such that the second key is actuated by pressing the second contact region to thereby actuate the second touch-sensitive region and the second switch.

9. The key/display assembly of claim 5, wherein the second key is further defined by the first switch such that the second key is actuated by pressing the second contact region to thereby actuate the first switch.

10. The key/display assembly of claim 9, wherein the touch-sensitive input panel is spaced apart from the second contact region such that the second key is actuated by pressing the second contact region without actuating the touch-sensitive input panel.

11. A key/display assembly, comprising:
a first switch;
a display module disposed aside the first switch;
a touch-sensitive input panel overlying the first switch and the display module, the touch-sensitive input panel including a first touch-sensitive region proximate the first switch and cantilevered past an edge of the display module;
a lens overlying the first switch, the display module, and the touch-sensitive input panel, the lens including a first contact region overlying the first touch-sensitive region; and
a first key having at least one of an invariant text character and an invariant functional character, the first key being further defined by the first switch, the first touch-sensitive region, and the first contact region such that the first key is actuated by pressing the first contact region to displace the first touch-sensitive region and thereby actuate the first switch.

12. The key/display assembly of claim 11, wherein the lens further includes a second contact region defining a second key having at least one of an invariant text character and an invariant functional character.

13. The key/display assembly of claim 12, wherein the lens is continuous between the first contact region and the second contact region.

14. The key/display assembly of claim 12, wherein the touch-sensitive input panel further includes a second touch-sensitive region, and the second key is further defined by the second touch-sensitive region such that the second key is actuated by pressing the second contact region to thereby actuate the second touch-sensitive region.

15. The key/display assembly of claim 14, further comprising a second switch, and wherein the second key is further defined by the second switch such that the second key is actuated by pressing the second contact region to thereby actuate the second touch-sensitive region and the second switch.

16. The key/display assembly of claim 12, wherein the second key is further defined by the first switch such that the second key is actuated by pressing the second contact region to thereby actuate the first switch.

17. The key/display assembly of claim 16, wherein the touch-sensitive input panel is spaced apart from the second contact region such that the second key is actuated by pressing the second contact region without actuating the touch-sensitive input panel.

* * * * *